(12) United States Patent
David

(10) Patent No.: US 7,685,872 B2
(45) Date of Patent: Mar. 30, 2010

(54) SYSTEM AND A METHOD FOR VEHICLE TESTING AND RESULTING VALUATION

(76) Inventor: Yona Ben David, Yasmin 4, Ramat Efal (IL) 52960

( * ) Notice: Subject to any disclaimer, the term of this patent is extended or adjusted under 35 U.S.C. 154(b) by 4 days.

(21) Appl. No.: 11/877,686

(22) Filed: Oct. 24, 2007

(65) Prior Publication Data

US 2008/0041147 A1 Feb. 21, 2008

Related U.S. Application Data

(63) Continuation-in-part of application No. 11/198,897, filed on Aug. 8, 2005, now Pat. No. 7,493,805.

(30) Foreign Application Priority Data

Sep. 23, 2007 (IL) ..................... 186166

(51) Int. Cl.
*G01M 17/00* (2006.01)

(52) U.S. Cl. .................. 73/115.01; 73/117.01; 73/123

(58) Field of Classification Search .............. 73/114.69, 73/114.71, 115.01, 115.02, 116.01, 116.06, 73/117.01, 118.01, 121, 123
See application file for complete search history.

(56) References Cited

U.S. PATENT DOCUMENTS 4,121,452 A * 10/1978 Wakabayashi et al. ... 73/116.06

* cited by examiner

*Primary Examiner*—Eric S McCall
(74) *Attorney, Agent, or Firm*—Naomi Assia Law Offices

(57) ABSTRACT

A method for automatic vehicle testing, inspection and valuation for a manual front wheel drive vehicle. The method includes connecting a probe for the emission test to the exhaust pipe and connecting the rpm cable to the cigarette lighter before starting the test. The testing begins by driving in so that the front wheels of the vehicle enter the VCT rollers, running the vehicle to 60 km/h and then shifting to 3rd gear. The method also includes accelerating to maximum rpm before shifting to neutral and waiting until the vehicle speed drops back to 60 km/h and after 3 seconds applying the brakes to stop. Then the vehicle is advanced until the rear wheels engage the VCT rollers and after 3 seconds the rollers start rolling up to 90 km/h. The foot brake is pumped systematically until the speed drops to 20 km/h, and then the parking brake is operated to stop. The overall vehicle is evaluated relative to the model and year of the vehicle.

28 Claims, 10 Drawing Sheets

Body Analysis Report

Body paint : Right side painting traces, Squashed, Body Scratch ← 1010

Medium Body repairs , Right side accident traces, Body /paint repair traces, Damage fenders, Body parts has been changed, Front right wing replaced, Front right door replaced, Rear right door replaced

} 1020

Body Summarized Condition | 71%

Fig. 10

SYSTEM AND A METHOD FOR VEHICLE TESTING AND RESULTING VALUATION

CROSS-REFERENCE TO RELATED APPLICATIONS

The present application is a continuation-in-part of U.S. patent application Ser. No. 11/198,897, Apparatus and Method for Testing a Vehicle, filed 8 Aug. 2005 now U.S. Pat. No. 7,493,805, by the same inventor, is hereby incorporated by cross-reference.

FIELD OF THE INVENTION

The present invention relates generally to vehicle testing, and more particularly, the invention relates to a system and a method for vehicle testing and resulting valuation

BACKGROUND OF THE INVENTION

Modern vehicles are high-performance machines. Yet, in many cases the testing systems used to determine their annual roadworthiness are inadequate. Conventional vehicle testing systems operate according to inappropriate specifications. This creates serious problems as well as a false sense of safety on the road. Existing conventional testing equipment does not meet European Economic Community (EEC) requirements, since its maximum broke testing speed is only six (6) km/h. EEC standards 71/320/EEC, 88/194/EEC and 92/54/EEC relating to road-worthiness of brake systems, state that all vehicles should be tested at road speeds of 80 to 120 km/h. This equipment was designed to test vehicles in static mode or a maximum of 5 km/h. Separate units check each safety system in a static mode. Results are subject to a tester's judgment.

Unsuitable vehicle testing by current testing methods were developed years ago and have not been adapted to modern high-performance vehicles and much greater traffic congestion. The emission-speed equation and regulations for vehicle emission are for more severe today. Computerized and electronic systems embedded in modern vehicles can monitor safety systems and control gas emissions according to road speed. It is therefore futile to run such tests at minimal speed 6 km/h.

Manufacturer's produce vehicles to very high safety and emission standards. Those vehicles are then driven at high speeds for tens or hundreds of thousands of kilometers. Testing systems are required to ensure that they continue to meet manufacturer's parameters after the vehicles are bought.

In the western world there are more vehicles produced every year than babies. With so many cars on the road, it is very hard to adequately check all mechanical conditions at a reasonable throughput rate. Stolen vehicles and false licenses are a major problem all over the world, with the numbers constantly increasing. This calls for changes in the existing vehicle licensing and administration systems and a strong database link to vehicle testing centers.

Many vital criteria cannot be adequately considered unless a vehicle is tested at simulated road speeds of 80-150 km/h:

How do brakes behave in emergency conditions?
How does braking affect the vehicle's steering at high speeds, as well as vehicle direction influenced by wheel deviation?
What happens when brake friction materials overheat at high speeds during a descent?
Does the speedometer count as o safety element?
Are gas quantities expelled at high velocity higher and more toxic than those at low velocity?
To what extent is wheel geometry influenced by high velocity, acceleration and deceleration?
What happens when there is excessive play in the suspension system?
How does the retarder react in road conditions?
What happens to the vehicle's direction at high speeds when the vehicle's thrust line does not coincide with the chassis centerline?

Defects in any of a vehicle's major systems can be dangerous and fatal. They need to be inspected in a fast, accurate and unbiased manner. Existing testing systems cannot do this.

Furthermore, all prior reports to the customer are non-graphical, black and white and scarce on detail, providing only pass/fail results and one or two sentences on each subsystem.

Many prior art Web sites provide choices of vehicles to be made from pictures of the vehicles, but do not provide detailed, graphical information. These sites typically provide make and model, price and location.

Prior art testing systems only provide testing of stationary vehicles for horsepower.

Thus it would be desirable to provide a user-friendly vehicle testing and evaluation system wherein vehicles are inspected in a fast, accurate and unbiased manner, thereby enabling and providing an accurate valuation.

SUMMARY OF THE INVENTION

Accordingly, it is a principal object of the present invention to provide a user-friendly vehicle testing and evaluation system wherein vehicles are inspected in a fast, accurate and unbiased manner, thereby enabling and providing an accurate valuation.

It is a second principal object of the present invention to provide an AUTOMATIC evaluation of vehicles as soon as the testing is completed.

It is a third principal object of the present invention to provide testing of vehicles at wheel speeds of up to 250 KPH for brakes, wheel alignment, horsepower, transmission and chassis.

It is another principal object of the present invention to provide a vehicle testing and resulting evaluation system that complies with EEC standards.

It is one other principal object of the present invention to provide technology that allows conventional vehicle testing systems around the world to be updated with current road needs.

It is one further principal object of the present invention to provide graphical, illustrated color vehicle testing reports, with detailed sub-system reports and numerical results.

It is still a further principal object of the present invention to provide a detailed comparison between test results and the manufacturer's specifications.

It is yet one further principal object of the present invention to provide a box for each potential flashpoint of each sub-system to enter comments and remarks about problems that were found.

It is yet another principal object of the present invention to provide illustrations of vehicle sub-systems in order to clearly illustrate the test being made and the results.

It is yet one more principal object of the present invention to provide reports over the Internet, indexed by make and model, price range and location, whereby consumers can find a vehicle they may want to purchase.

A method is disclosed for automatic vehicle testing, inspection and valuation for a manual front wheel drive vehicle. The method includes connecting a probe for the emission test to the exhaust pipe and connecting the rpm cable to the cigarette lighter before starting the test. The testing begins by driving in so that the front wheels of the vehicle enter the VCT rollers, running the vehicle to 60 km/h and then shifting to 3rd gear. The method also includes accelerating to maximum rpm before shifting to neutral and waiting until the vehicle speed drops back to 60 km/h and after 3 seconds applying the brakes to stop. Then the vehicle is advanced until the rear wheels engage the VCT rollers and after 3 seconds the rollers start rolling up to 90 km/h. The foot brake is pumped systematically until the speed drops to 20km/h, and then the parking brake is operated to stop. The overall vehicle is evaluated relative to the model and year of the vehicle.

The present invention provides multi-function testing of modern vehicles with its Vehicle Characteristic Tester (VCT) and Computer Closed Circuit (CCC) systems. It is the only tester to fully comply with EEC standards on roadworthiness.

VCT Advantages
  Simultaneous testing—one multi-function unit simultaneously tests all the vehicle's dynamic systems parameters.
  Real road conditions—testing station simulates real road conditions for speeds up to 200 km/h. Results are compared to relative functions for objective analysis.
  Rapid operation—one tester can complete all test stages in less than five minutes. Testing program is color-coded and easy to follow on a large monitor.
  Full computer control—communicates with a host computer/server for statistical analysis and for state control of vehicles. All test results can be presented in a detailed printed report. Latest vehicle testing parameters are always updated.
  Complete connectivity to manufacturers' data, state regulations and requirements, licensing information and other computerized testing instruments.
  Supports new systems—ideal for testing new systems or prototypes. Easily integrates emerging technologies in new vehicles.

VCT Applications

Functionality
  Safety testing For Roadworthiness. Official Control and Emission Control test stations.
  Emission control test stations.
  Second hand cars—pre-purchase inspections and pricing. Preventive maintenance for fleet owners.
  Pre-insurance vehicle test for insurance companies. After market vehicle control services.

Market Sectors
  Vehicle Manufacturers—testing prototypes and end-of-line quality control. Police—for mobile on-the-road control stations.
  Racing cars—development and labs.
  Off-road 4×4 and 6×6 vehicle testing.
  Military vehicle testing.
  Taxi cabs and trucks—instrumentation control for taximeter, tachograph and speed limiter controls.
  Modern vehicles need modern testing systems that replicate real road conditions. Only Present invention VCT system currently meets these needs.

VCT system of the present invention has been fully tested by the German Technical Inspection Association (TÜV) and authorized for accuracy and reliability.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of a non-limiting example only, with reference to the accompanying drawings, in which:

FIG. 10 is a schematic illustration of the body system and analysis report of the overall VCT system, constructed according to the principles of the present invention.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
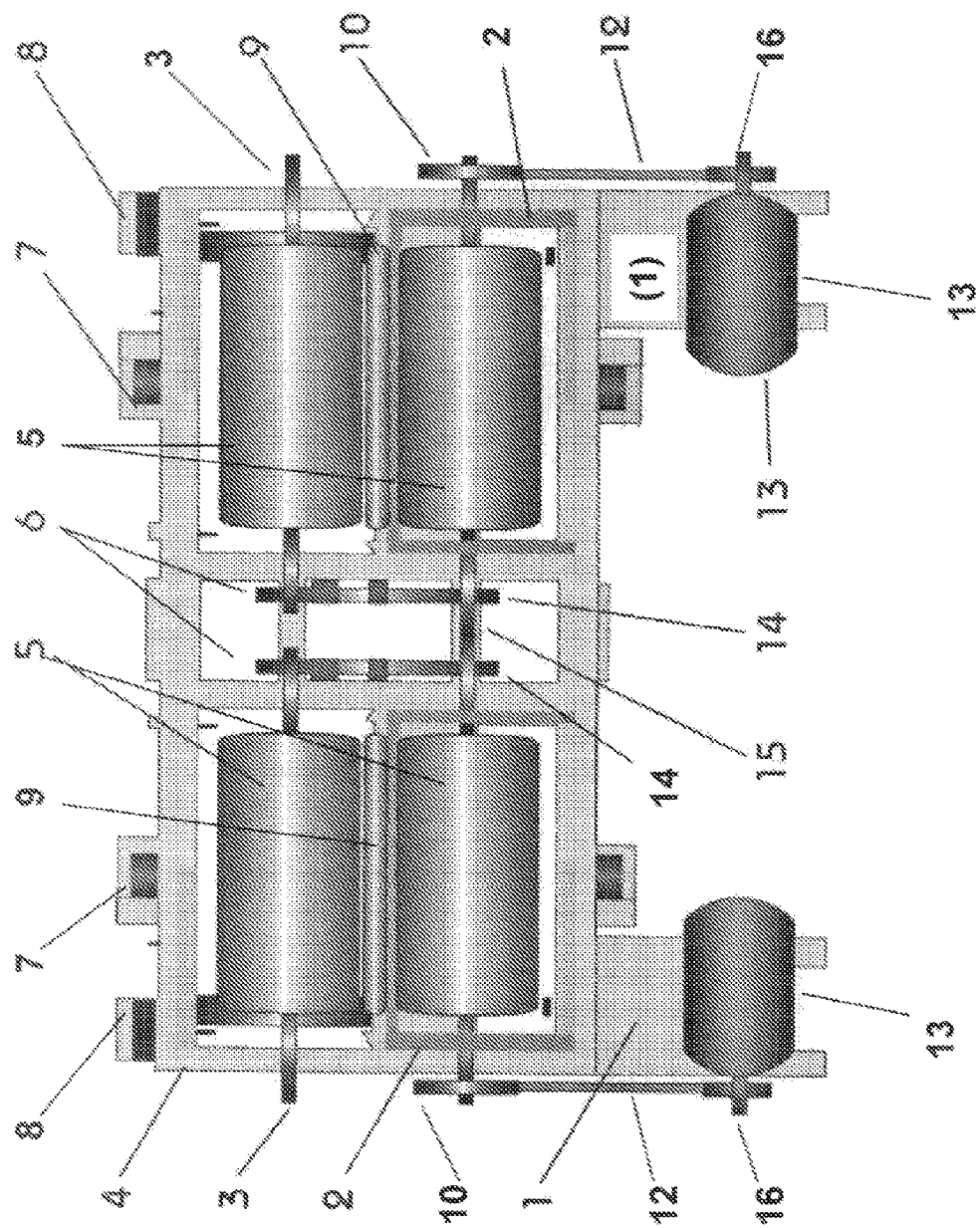
FIG. 1 is a layout of the Vehicle Characteristic Tester (VCT) system, constructed according to the principles of the present invention.

FIG. 1 is a layout of the Overall VCT system, constructed according to the principles of the present invention. A pair of motor brackets 1, attached to a frame 4, hold a pair of electric motors 13. Electric motors 13 drive a pair of motor pulleys 16, which use a pair of driving belts 12 to drive a pair of roller pulleys 10. Roller pulleys 10, in turn, drive a pair of driving chains with sprockets 14, encumbered by a load simulator 15. Two pairs of inertia rollers 5 are driven by the wheels of the vehicle, and inertia rollers 5, in turn drive a pair of roller shafts 3. Inertia rollers 5 also drive a pair of floating rollers 9. The speed of roller shafts 3 is measured by a pair of inertia sensors 6. Frame 4 also houses a pair of roller brakes 7 and pneumatic springs 8. A pair of lift bridges 2 lift the vehicle free of the rollers.

Figure 2:
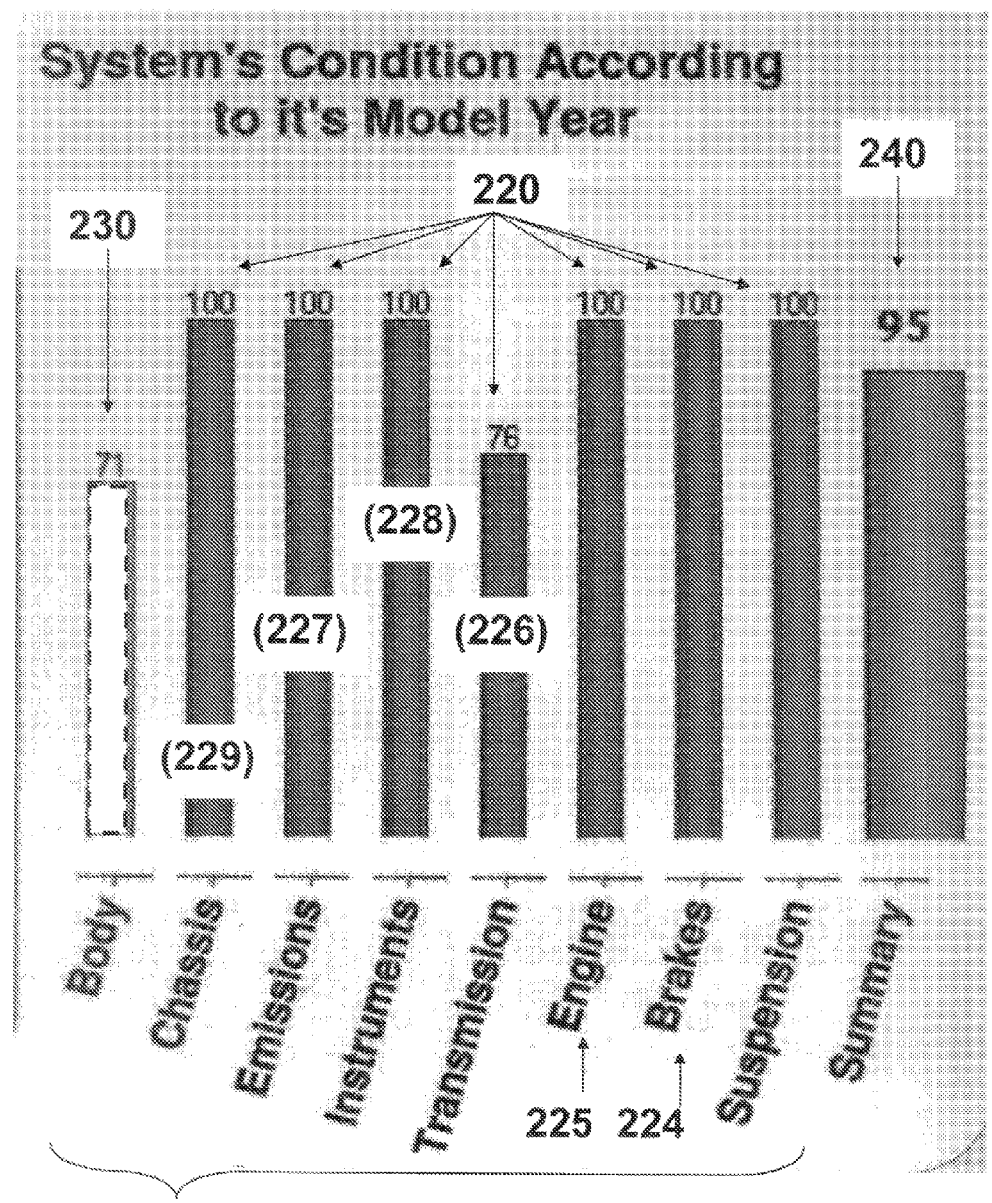
FIG. 2 is a bar chart evaluation of the systems of the overall VCT system, constructed according to the principles of the present invention.

FIG. 2 is a bar chart evaluation of the systems of the overall VCT system, constructed according to the principles of the present invention. A bar is shown with a length 210 and a percentage value 220 according to its value relative to its model year. If any value is particularly low, it is shown as a white bar with dashed outline 230. The summary value of all the systems is shown as a wide bar 240.

Figure 3:
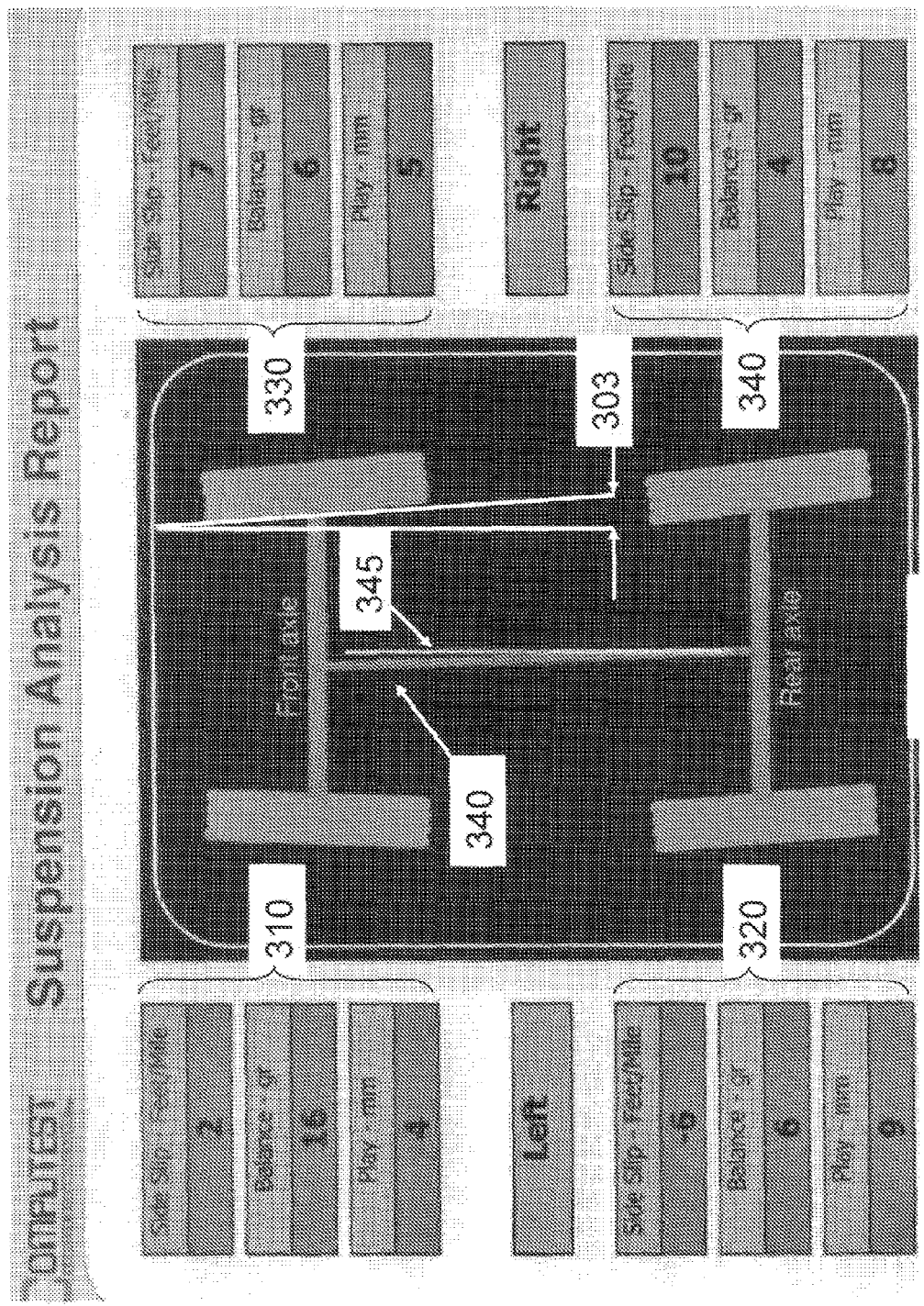
FIG. 3 is a schematic illustration of the suspension system and analysis report of the overall VCT system, constructed according to the principles of the present invention.

FIG. 3 is a schematic illustration of the suspension system and analysis report of the overall VCT system, constructed according to the principles of the present invention. Values are shown for the left side front 310, the left side rear 320, the right side front 330 and the right side rear 340. These values include the side slip thrust in feet/mile, which is 7 for the right front side. A wheel alignment angle is illustrated for each wheel, for example reference block 303 shows the angle of alignment for the right front wheel. The angle between the chassis line 340 connecting the front and rear axles should be substantially parallel to the vehicle centerline 345.

| Suspension |
| --- |
| suspension geometry |
| wheel alignment |
| wheel balance |
| suspension play |
| suspension wear |
| wheel vibrations |
| chassis parallelism |
| shock absorbers |
| chassis thrust line versus center line |

Figure 4:
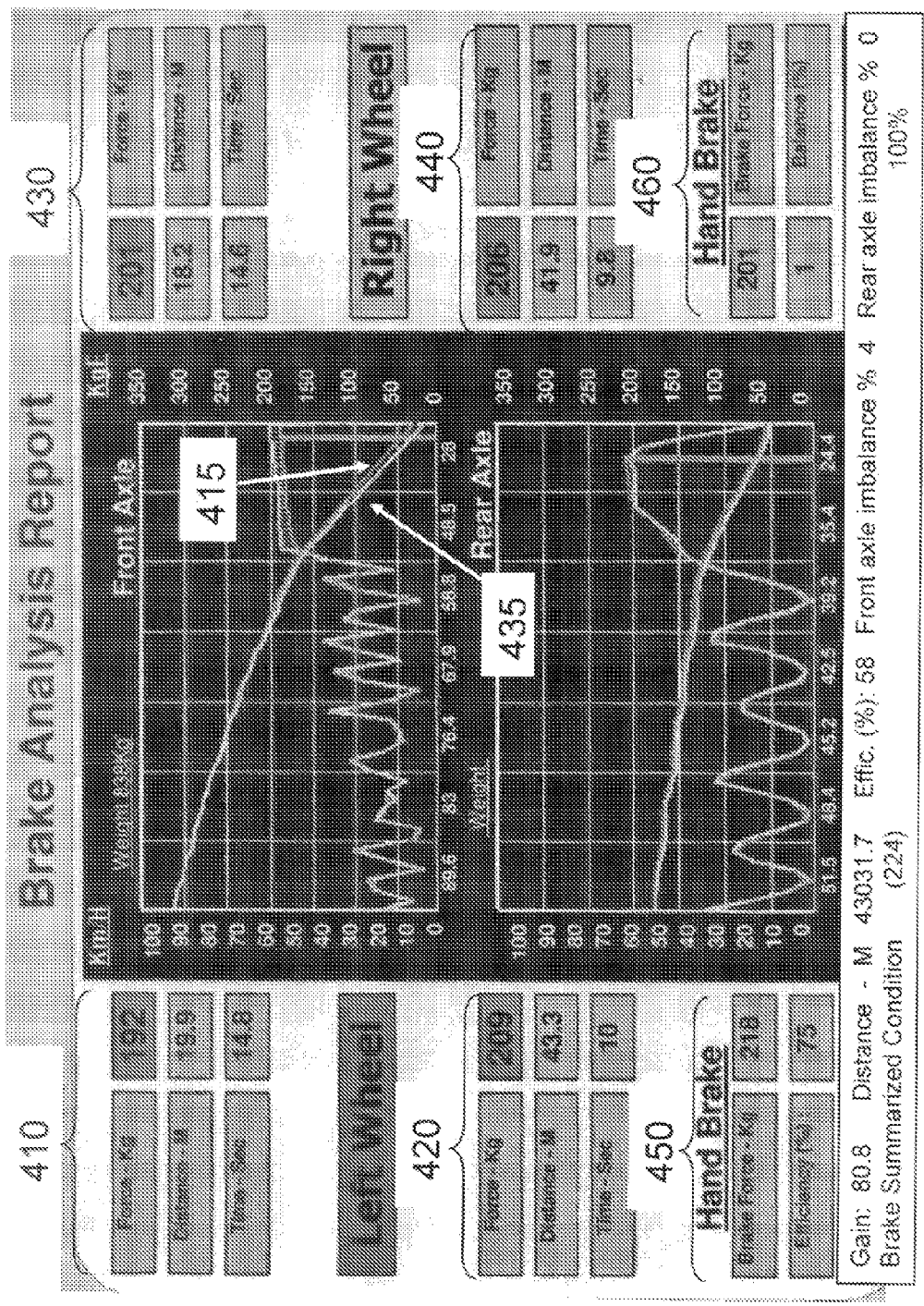
FIG. 4 is a schematic illustration of the brake system and analysis report of the overall VCT system, constructed according to the principles of the present invention.

FIG. 4 is a schematic illustration of the brake system and analysis report of the overall VCT system, constructed according to the principles of the present invention. Values are shown for the left side front 410, the left side rear 420, the right side front 430 and the right side rear 440. Values are also shown for effect of the hand brake on the left side 450 and the tight side 460. Brake summarized condition 224 given on the bar chart of FIG. 2 is also shown here. The front axle imbalance of 4%, in contrast of the rear axle imbalance of 0%, reflects the fact that the breaking speed of the right front wheel 435 goes from 93 Km/hr to 3 Km/hr while that of the left front wheel 415 goes from 93 Km/hr to 6 Km/hr, resulting in a 4% difference. The two similar lines for the rear wheels are essentially one line and have a 0% difference.

| Brakes |
| --- |
| brake force per wheel |
| brake balance - left to right |
| broke efficiency |
| brake gain |
| brake distance |
| braking time |
| foot pedal pressure |
| buses and trucks retarder |
| parking brakes |

Figure 5:
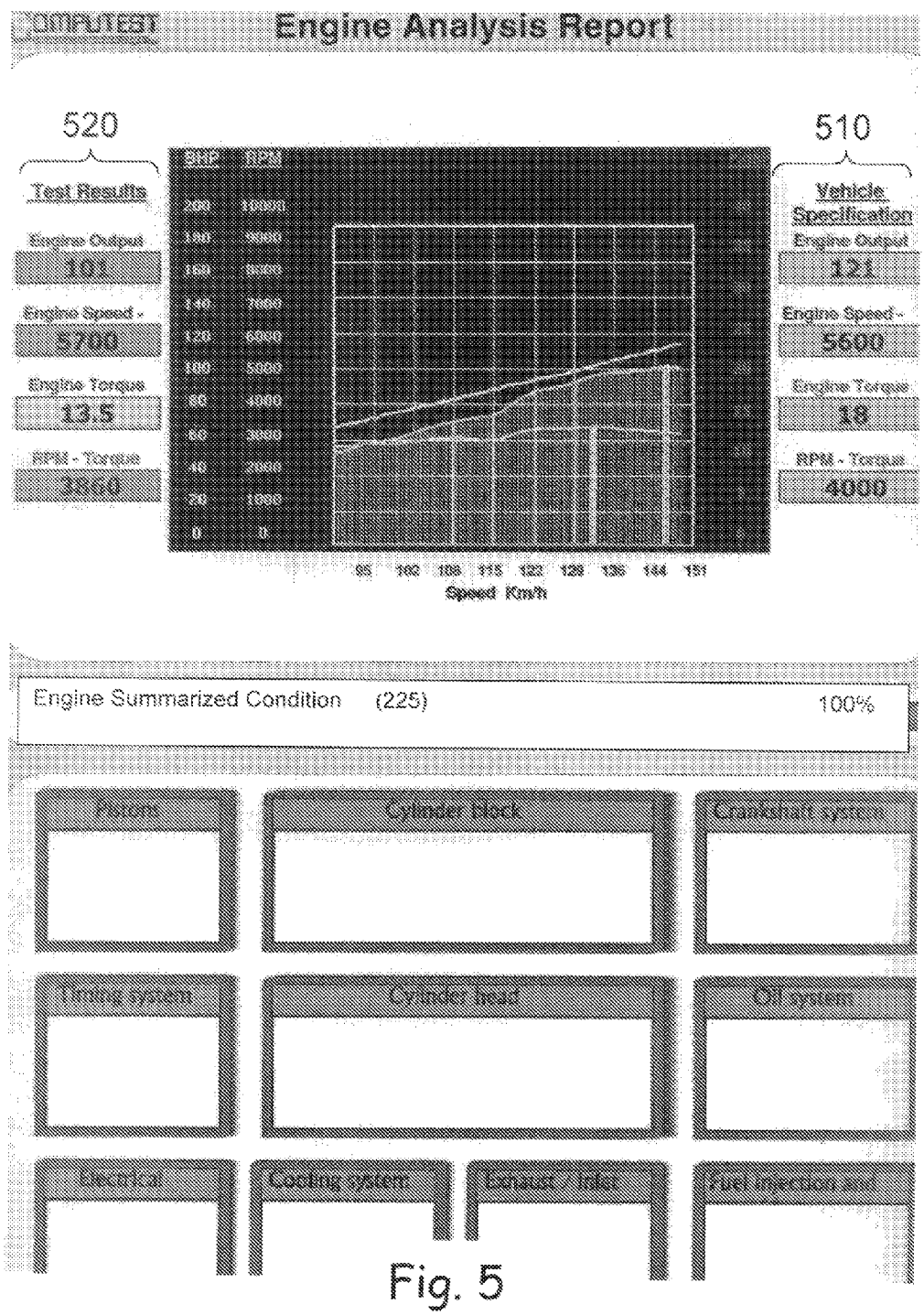
FIG. 5 is a schematic illustration of the engine system and analysis report of the overall VCT system, constructed according to the principles of the present invention.

FIG. 5 is a schematic illustration of the engine system and analysis report of the overall VCT system, constructed according to the principles of the present invention. The vehicle specification values 510 are shown, as well as the corresponding test values 520. Engine summarized condition 225 given on the bar chart of FIG. 2 is also shown here.

| Engine |
| --- |
| horsepower |
| torque |
| rpm |
| wheel thrust force |
| mechanical losses in drivetrain |
| rolling resistance |
| oil consumption and its origin: pistons or valve guides |
| cylinder crankcase pressure: indicates engine wear |
| cooling system pressure: indicates cylinder head condition |

Figure 6:
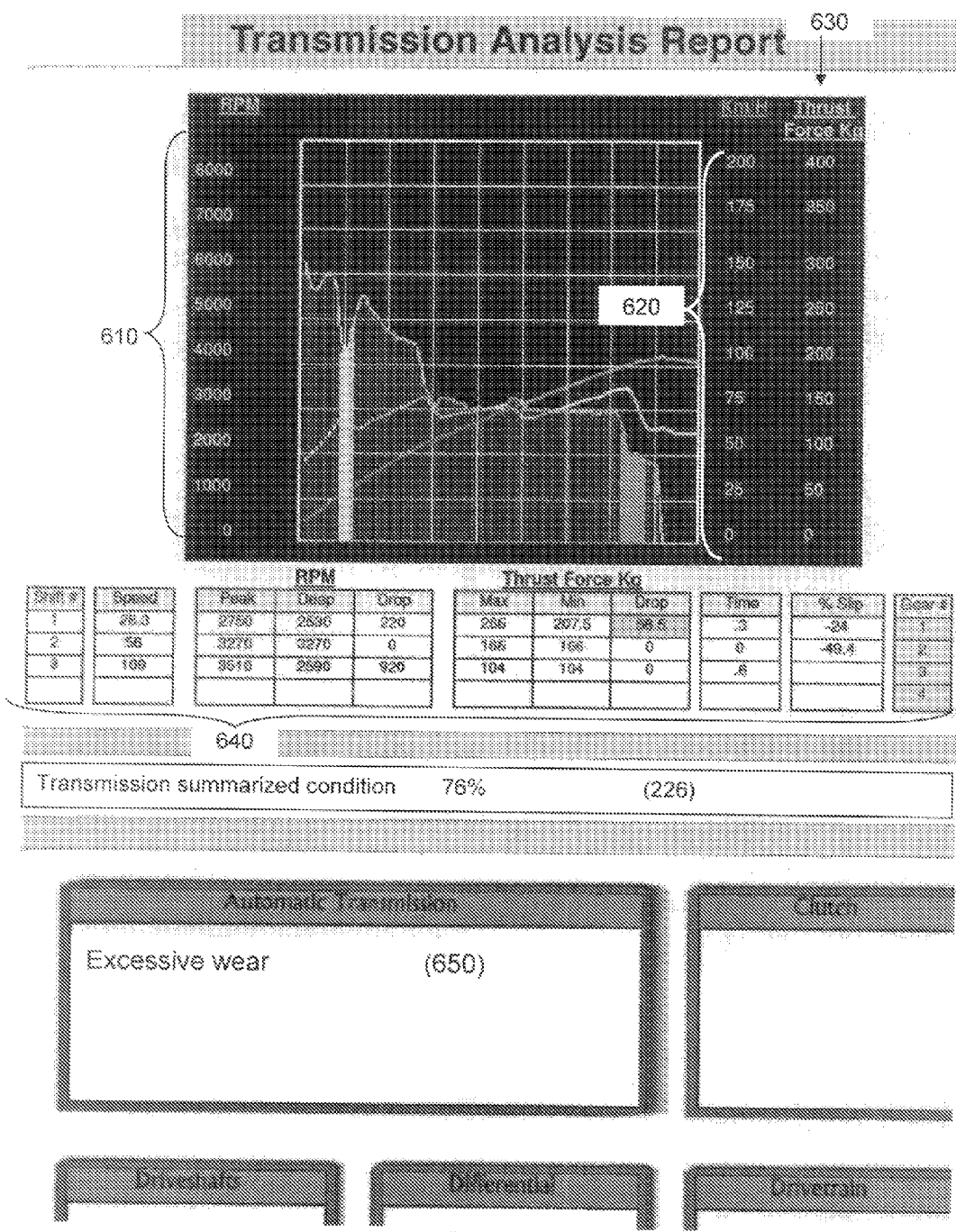
FIG. 6 is a schematic illustration of the transmission system and analysis report of the overall VCT system, constructed according to the principles of the present invention.

FIG. 6 is a schematic illustration of the transmission system and analysis report of the overall VCT system, constructed according to the principles of the present invention. RPM 610, speed 620 and thrust 630 are graphed over time and shown in table form 640. Transmission summarized condition 226 given on the bar chart of FIG. 2 is also shown here. Boxes are given for reporting any unusual problem with various transmission subsystems. For example, excessive wear 650 is reported for an automatic transmission.

| Automatic transmission |
| --- |
| gear slip |
| thrust peak |
| gear ratio |
| engine speed peak |
| shift time |
| continuously variable transmission |

| Manual transmission |
| --- |
| excessive play |
| noise |
| shift |
| drivetrain: vibrations, play. |
| clutch slip test |

Figure 7:
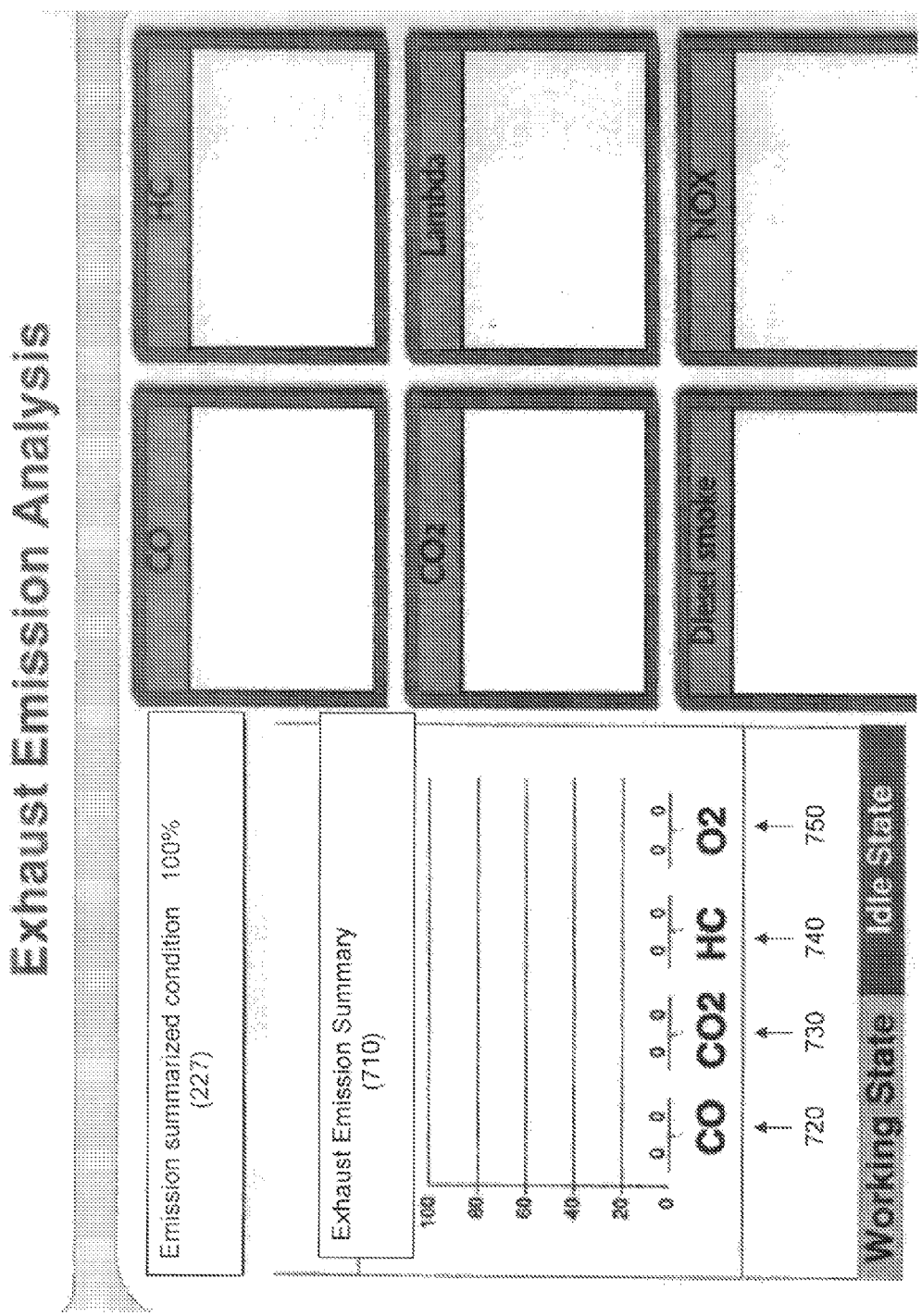
FIG. 7 is a schematic illustration of the instrument system and analysis report of the overall VCT system, constructed according to the principles of the present invention.

FIG. 7 is a schematic illustration of the exhaust emission system and analysis report of the overall VCT system, constructed according to the principles of the present invention. A table is provided to list emission results for various gases: carbon monoxide 720, carbon dioxide 730, hydrocarbons 740 and oxygen 750. Emission summarized condition 227 given on the bar chart of FIG. 2 is also shown here.

| Emissions and economy |
| --- |
| exhaust emissions: co, hc, <02, 02, nos, lambda, |
| specific fuel consumption |
| fuel flow |
| noise test |

Figure 8:
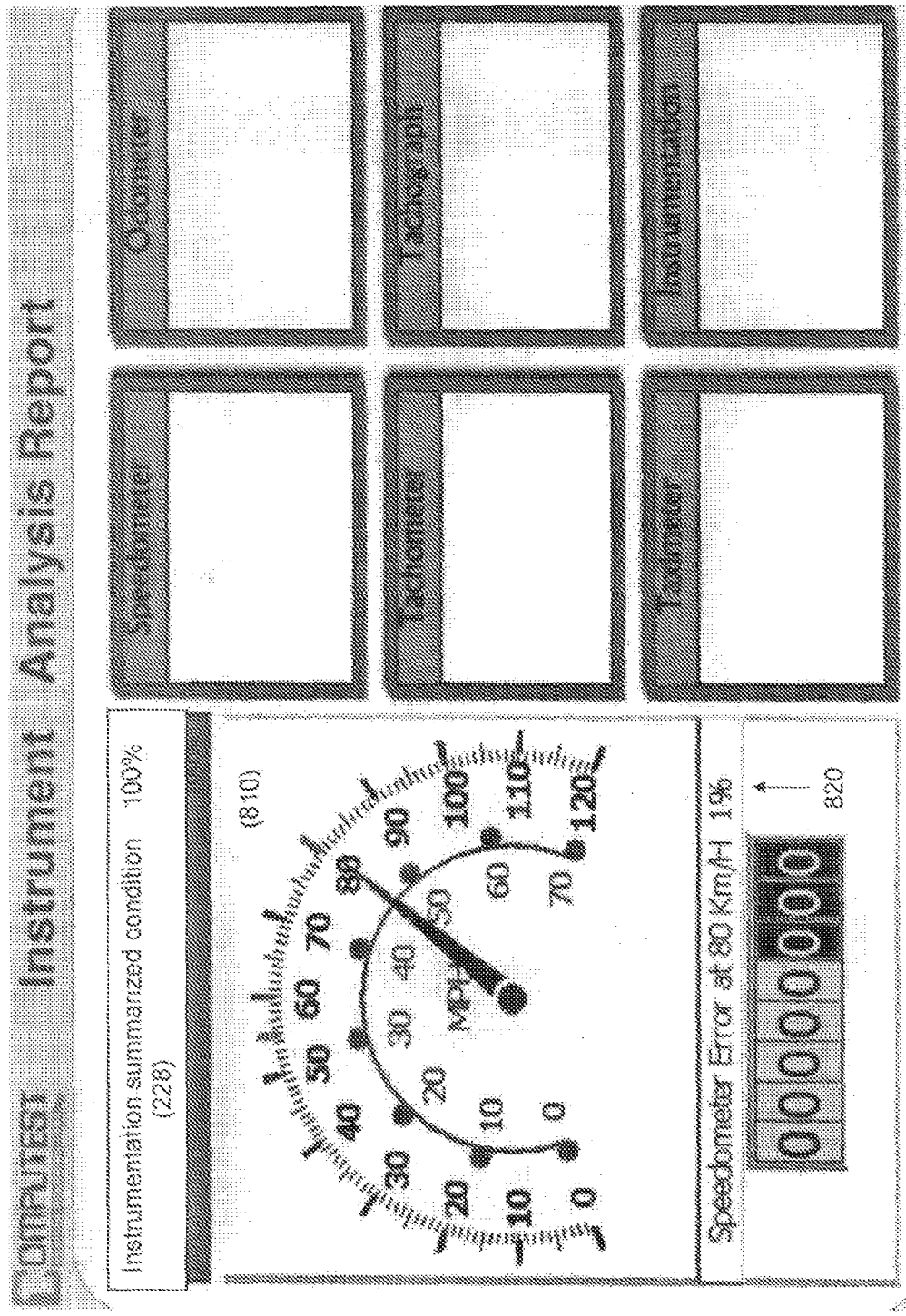
FIG. 8 is a schematic illustration of the exhaust system and analysis report of the overall VCT system, constructed according to the principles of the present invention.

FIG. 8 is a schematic illustration of the instrument system and analysis report of the overall VCT system, constructed according to the principles of the present invention. An analog view of the speedometer reading 810 is shown, as well as the speedometer error of 1% at 80 km/hr 820. Instrumentation summarized condition 228 given on the bar chart of FIG. 2 is also shown here.

| Instrument accuracy |
|---|
| speedometer |
| odometer |
| tachometer |
| taximeter |
| tachograph |
| speed limiters |

Figure 9:
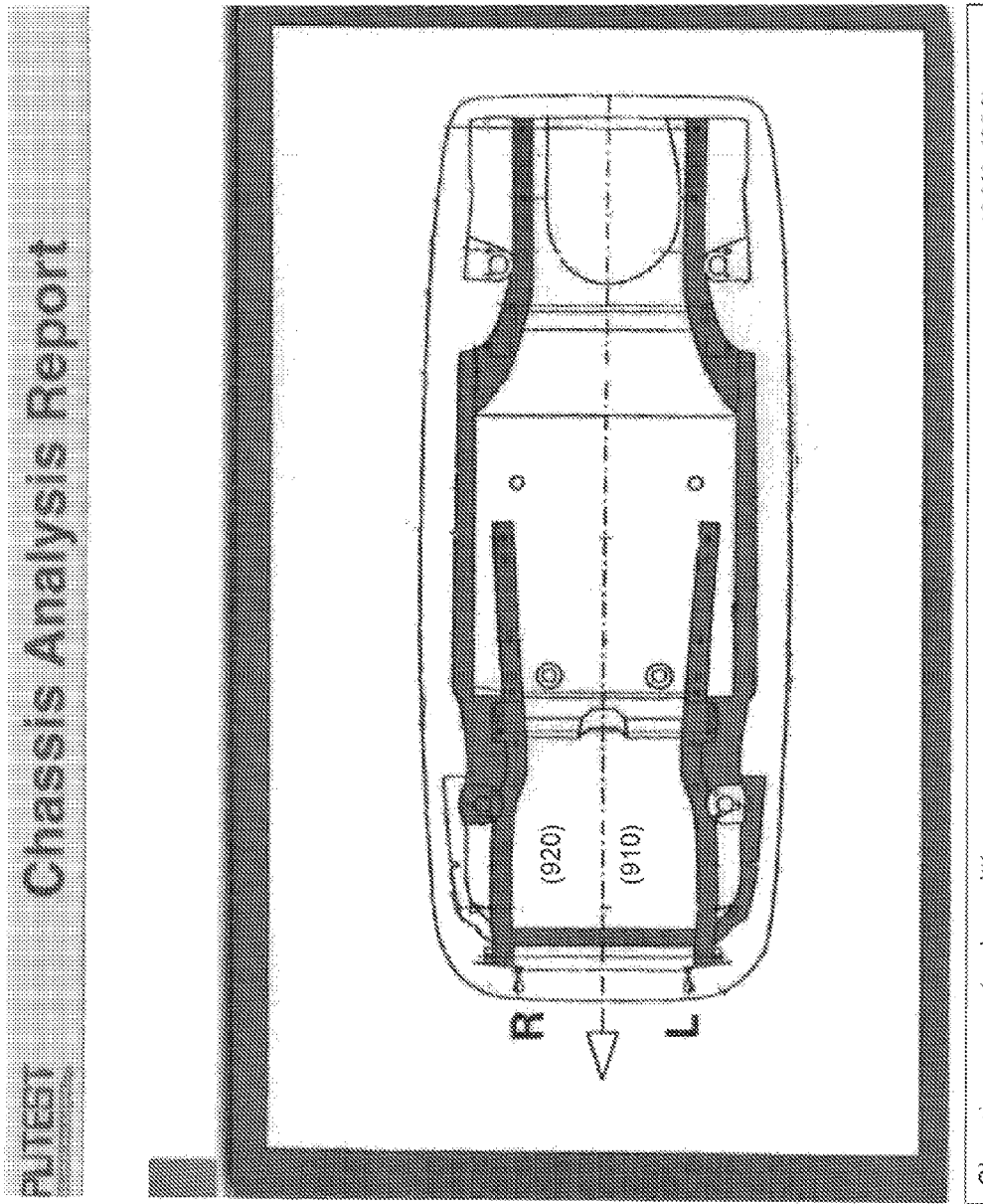
FIG. 9 is a schematic illustration of the chassis system and analysis report of the overall VCT system, constructed according to the principles of the present invention.

FIG. 9 is a schematic illustration of the chassis system and analysis report of the overall VCT system, constructed according to the principles of the present invention. Features are shown for the left side chassis 910 and the right side chassis 920. Chassis condition 229 given on the bar chart of FIG. 2 is also shown here.

FIG. 10 is a schematic illustration of the body system and analysis report of the overall VCT system, constructed according to the principles of the present invention. Observations are recorded for body paint blemishes 1010 as well as medium body repairs 1020. Body summarized condition 230 given on the bar chart of FIG. 2 is also shown here.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A meted for automatic vehicle testing, inspection and valuation for a manual front wheel drive vehicle, said method comprising:
    connecting a probe for an emission test to the exhaust pipe;
    connecting an rpm cable to the cigarette lighter before starting the test;
    driving in so that the front wheels of the vehicle enter a Vehicle Characteristic Tester (VCT) rollers;
    running the vehicle to 60 km/h and then shifting to 3rd gear;
    accelerating to maximum rpm before shifting to neutral;
    waiting until vehicle speed drops back to 60 km/h and after 3 seconds applying the brakes to stop;
    advancing the vehicle until the rear wheels engage the VCT rollers and after 3 seconds the rollers start rolling up to 90 km/h;
    pumping the foot brake systematically until the speed drops to 20 km/h, and then operating the parking brake to stop;
    automatically checking and printing at least one parameter graph;
    evaluating and printing at least one parameter relative to the model and year of the vehicle; and
    evaluating the overall vehicle relative to the model and year of the vehicle.

2. The method of claim 1, wherein said vehicle testing and resulting evaluation system allows vehicle testing systems around the world to be updated with current road needs.

3. The method of claim 1, wherein said vehicle testing and resulting evaluation system provides graphical, illustrated color vehicle testing reports, with detailed sub-system reports and numerical results.

4. The method of claim 1, wherein said vehicle testing and resulting evaluation system provides a detailed comparison between test results and the manufacturer's specifications.

5. The method of claim 1, wherein said vehicle testing and resulting evaluation system provides a box for each potential flashpoint of each sub-system to enter comments and remarks about problems that were found.

6. The method of claim 1, wherein said vehicle testing and resulting evaluation system provides illustrations of vehicle sub-systems in order to clearly illustrate the test being made and the results.

7. The method of claim 1, wherein said vehicle testing and resulting evaluation system provides reports over the Internet, indexed by make and model, price range and location, whereby consumers can find a vehicle they may want to purchase.

8. A method for automatic vehicle testing, inspection and valuation for an automatic transmission front wheel drive vehicle, said method comprising:
    connecting a probe for an emission test to the exhaust pipe;
    connecting the rpm cable to cigarette lighter before starting the test;
    driving in so that the front wheels of the vehicle enter a VCT rollers;
    starting in "Drive" and accelerating fully until the top gear is reached, then braking to a stop;
    advancing the vehicle until the rear wheels engage the VCT rollers and after 3 seconds the rollers start rolling up to 90 km/h;
    pumping the foot brake systematically until the speed drops to 20 km/h, and then operates the parking brake to stop;
    automatically checking and printing at least one parameter graph;
    evaluating and printing at least one parameter relative to the model and year of the vehicle; and
    evaluating the overall vehicle relative to the model and year of the vehicle.

9. The method of claim 8, wherein said vehicle testing and resulting evaluation system allows vehicle testing systems around the world to be updated with current road needs.

10. The method of claim 8, wherein said vehicle testing and resulting evaluation system provides graphical, illustrated color vehicle testing reports, with detailed sub-system reports and numerical results.

11. The method of claim 8, wherein said vehicle testing and resulting evaluation system provides a detailed comparison between test results and the manufacturer's specifications.

12. The method of claim 8, wherein said vehicle testing and resulting evaluation system provides a box for each potential flashpoint of each sub-system to enter comments and remarks about problems that were found.

13. The method of claim 8, wherein said vehicle testing and resulting evaluation system provides illustrations of vehicle sub-systems in order to clearly illustrate the test being made and the results.

14. The method of claim 8, wherein said vehicle testing and resulting evaluation system provides reports over the Internet, indexed by make and model, price range and location, whereby consumers can find a vehicle they may want to purchase.

15. A method for automatic vehicle testing, inspection and valuation for a manual rear wheel drive vehicle, said method comprising:
    connecting a probe for an emission test to the exhaust pipe;
    connecting an rpm cable to the cigarette lighter before starting the test;

driving in so that the front wheels of a vehicle enter the VCT rollers;

running the vehicle to 60 km/h and then shifting to 3rd gear;

accelerating to maximum rpm before shifting to neutral;

waiting until vehicle speed drops back to 60 km/h and after 3 seconds applying the brakes to stop;

advancing the vehicle until the rear wheels engage the VCT rollers and after 3 seconds the rollers start rolling up to 90 km/h;

pumping the foot brake systematically until the speed drops to 20 km/h, and then operates the parking brake to stop;

automatically checking and printing at least one parameter graph;

evaluating and printing at least one parameter relative to the model and year of the vehicle; and evaluating the overall vehicle relative to the model and year of the vehicle.

16. The method of claim 15, wherein said vehicle testing and resulting evaluation system allows vehicle testing systems around the world to be updated with current road needs.

17. The method of claim 15, wherein said vehicle testing and resulting evaluation system provides graphical, illustrated color vehicle testing reports, with detailed sub-system reports and numerical results.

18. The method of claim 15, wherein said vehicle testing and resulting evaluation system provides a detailed comparison between test results and the manufacturer's specifications.

19. The method of claim 15, wherein said vehicle testing and resulting evaluation system provides a box for each potential flashpoint of each sub-system to enter comments and remarks about problems that were found.

20. The method of claim 15, wherein said vehicle testing and resulting evaluation system provides illustrations of vehicle sub-systems in order to clearly illustrate the test being made and the results.

21. The method of claim 15, wherein said vehicle testing and resulting evaluation system provides reports over the Internet, indexed by make and model, price range and location, whereby consumers can find a vehicle they may want to purchase.

22. A method for automatic vehicle testing, inspection and valuation for an automatic transmission rear wheel drive vehicle, said method comprising:

connecting a probe for an emission test to the exhaust pipe;

connecting the an cable to the cigarette lighter before starting the test;

driving in so that the front wheels of the vehicle enter a VCT rollers;

starting in "Drive" and accelerating fully until the tap gear is reached, then braking to a stop;

advancing the vehicle until the rear wheels engage the VCT rollers and after 3 seconds the rollers start rolling up to 90 km/h;

pumping the foot brake systematically until the speed drops to 20 km/h, and then operates the parking brake to stop;

automatically checking and printing at least one parameter graph;

evaluating and printing at least one parameter relative to the model and year of the vehicle; and evaluating the overall vehicle relative to the model and year of the vehicle.

23. The method of claim 22, wherein said vehicle testing and resulting evaluation system allows vehicle testing systems around the world to be updated with current road needs.

24. The method of claim 22, wherein said vehicle testing and resulting evaluation system provides graphical, illustrated color vehicle testing reports, with detailed sub-system reports and numerical results.

25. The method of claim 22, wherein said vehicle testing and resulting evaluation system provides a detailed comparison between test results and the manufacturer's specifications.

26. The method of claim 22, wherein said vehicle testing and resulting evaluation system provides a box for each potential flashpoint of each sub-system to enter comments and remarks about problems that were found.

27. The method of claim 22, wherein said vehicle testing and resulting evaluation system provides illustrations of vehicle sub-systems in order to clearly illustrate the test being made and the results.

28. The method of claim 22, wherein said vehicle testing and resulting evaluation system provides reports over the Internet, indexed by make and model, price range and location, whereby consumers can find a vehicle they may want to purchase.

* * * * *